US007388467B2

(12) United States Patent
Fisher et al.

(10) Patent No.: US 7,388,467 B2
(45) Date of Patent: Jun. 17, 2008

(54) SYSTEM AND METHOD FOR DETERMINING A STATE OF A DOOR

(75) Inventors: Joseph John Fisher, Austin, TX (US); Nick Andrew Van Stralen, Ballston Lake, NY (US); Kenneth B. Welles, Scotia, NY (US); Jeffrey Michael Ashe, Gloversville, NY (US); James D. York, Salem, OR (US)

(73) Assignee: GE Security, Inc., Austin, TX (US)

( * ) Notice: Subject to any disclaimer, the term of this patent is extended or adjusted under 35 U.S.C. 154(b) by 213 days.

(21) Appl. No.: 11/274,795

(22) Filed: Nov. 15, 2005

(65) Prior Publication Data

US 2008/0084299 A1 Apr. 10, 2008

(51) Int. Cl.
*G05B 19/00* (2006.01)

(52) U.S. Cl. .................... 340/5.61; 340/5.62; 340/5.2; 340/5.8; 340/541; 340/545; 340/556; 340/557; 340/528; 307/10.1; 307/10.6

(58) Field of Classification Search .............. 340/5.61, 340/5.2, 5.8, 541, 545, 556, 557, 528; 307/10.1, 307/10.6
See application file for complete search history.

(56) References Cited

U.S. PATENT DOCUMENTS

| | | | | |
|---|---|---|---|---|
| 5,040,331 | A | 8/1991 | Merendino et al. | |
| 5,712,626 | A | 1/1998 | Andreou et al. | |
| 5,816,085 | A | 10/1998 | Winardi et al. | |
| 5,852,944 | A * | 12/1998 | Collard et al. | 70/278.7 |
| 6,076,385 | A | 6/2000 | Pedroso et al. | |
| 6,225,903 | B1 * | 5/2001 | Soloway et al. | 340/542 |
| 6,244,084 | B1 | 6/2001 | Warmack | |
| 6,351,977 | B1 | 3/2002 | Pedroso et al. | |
| 6,441,735 | B1 | 8/2002 | Marko et al. | |
| 6,580,355 | B1 | 6/2003 | Milo | |
| 6,612,141 | B2 | 9/2003 | Bates et al. | |
| 6,720,861 | B1 | 4/2004 | Rodenbeck et al. | |
| 6,867,685 | B1 | 3/2005 | Stillwagon | |
| 6,967,562 | B2 | 11/2005 | Menard et al. | |
| 7,034,657 | B2 * | 4/2006 | Ueda et al. | 340/5.62 |

(Continued)

*Primary Examiner*—Tai Nguyen
(74) *Attorney, Agent, or Firm*—Eugene Hyun, Esq.; Armstrong Teasdale LLP

(57) ABSTRACT

A system for determining a state of a door having a locking mechanism for locking the door includes a locking mechanism and a door sensor. The locking mechanism sensor is disposed for sensing a condition of the locking mechanism and generating a signal indicative thereof. The door sensor disposed for sensing a condition of the door and generating a signal indicative thereof. The system further includes a processor for determining a state of the door, in response to the signals from the locking mechanism sensor and the door sensor. The state of the door is a secured state when the door sensor senses the condition of the door as closed and the locking mechanism sensor senses the condition of the locking mechanism as locked. A method for determining a state of a door having a locking mechanism for locking the door includes sensing a condition of the locking mechanism and sensing a condition of the door. The method further includes, determining a state of the door as a secured state when the condition of the locking mechanism is sensed as locked and the condition of the door is sensed as closed.

20 Claims, 1 Drawing Sheet

U.S. PATENT DOCUMENTS 7,113,070 B2 9/2006 Deng et al.
7,151,325 B2 * 12/2006 Matsubara et al. ........ 307/10.6
2006/0175899 A1 * 8/2006 Nagano et al. ............ 307/10.1

* cited by examiner

SYSTEM AND METHOD FOR DETERMINING A STATE OF A DOOR

BACKGROUND OF THE INVENTION

This disclosure relates generally to a system and method for determining a state of a door having a locking mechanism for locking the door. More specifically, this disclosure relates to a system and method for determining a state of the door as a secured state when the door is sensed as closed and the locking mechanism is sensed as locked.

In multi-unit buildings, many security systems currently employ remotely operated door locks. The remotely operated door locks receive command signals from a central control unit and responsively lock or unlock the door. However, existing systems do not monitor or return door status information. For example, if the door is unable to lock because of misalignment, the door being ajar, or the locking mechanism being jammed the central control unit is not aware that the door is not properly locked and therefore the building is not secure. Additionally, while some current security systems do monitor the position of the door relative to the doorframe they do not monitor the position of the door locking mechanism. Consequently, such systems may not be aware of changes in the status of the position of the door and/or the locking mechanism.

Accordingly, a continued need exist for improved security systems for door locks, particularly in multi-unit buildings.

BRIEF DESCRIPTION OF THE INVENTION

In an exemplary embodiment of the invention, a system for determining a state of a door having a locking mechanism for locking the door is presented. The system includes a locking mechanism sensor disposed for sensing a condition of the locking mechanism and generating a signal indicative thereof, and a door sensor disposed for sensing a condition of the door and generating a signal indicative thereof. The system further includes a processor for determining a state of the door, in response to the signals from the locking mechanism sensor and the door sensor. The state of the door is a secured state when the door sensor senses the condition of the door as closed and the locking mechanism sensor senses the condition of the locking mechanism as locked.

In another exemplary embodiment of the invention, a method for determining a state of a door having a locking mechanism for locking the door is presented. The method includes sensing a condition of the locking mechanism and sensing a condition of the door. The method further includes, determining a state of the door as a secured state when the condition of the locking mechanism is sensed as locked and the condition of the door is sensed as closed.

In yet another exemplary embodiment of the invention, a system for determining a state of a door having a locking mechanism for locking the door is presented. The system includes means for sensing a condition of the locking mechanism and generating a signal indicative thereof and means for sensing a condition of the door and generating a signal indicative thereof. The system further includes means for determining a state of the door in response to the signals from the locking mechanism sensor and the door sensor. The state of the door is a secured state when the door sensor senses the condition of the door as closed and the locking mechanism sensor senses the condition of the locking mechanism as locked.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

These and other features, aspects, and advantages of the disclosure hereof will become better understood when the following detailed description is read with reference to the accompanying figures, wherein.

DETAILED DESCRIPTION OF THE INVENTION

Figure 1:
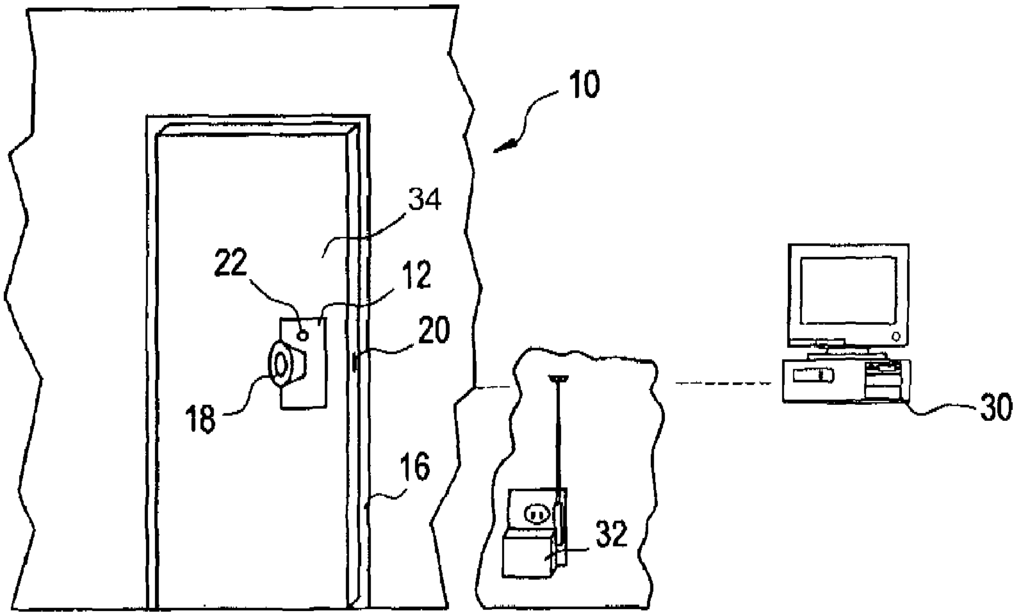
FIG. 1 is an elevational view of a system for determining a state of a door of the present invention.
Figure 2:
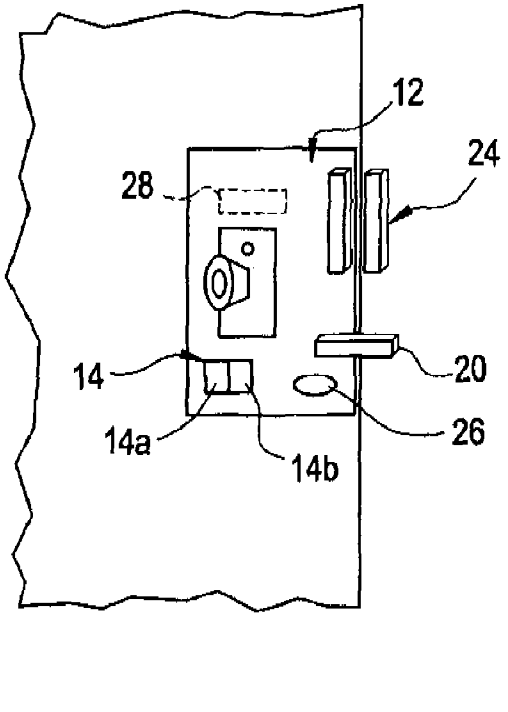
FIG. 2 is an interior partial elevational view of the system for determining a state of a door of the present invention.

Referring to FIG. 1 an exemplary embodiment of a two-way communicating door lock system is generally shown at 10. System 10 comprises an electronic door lock assembly 12 and a two-way communication module 14 (FIG. 2). The electronic door lock assembly 12 can be any type of lock including, but not limited to, a deadbolt, a pin lock, or a gate lock. The lock assembly 12 may be locked or unlocked from the outside with a key (conventional or magnetic), a key card (magnetic or punched holes), a security code, a FOB, or a button, as are known. In the case of a FOB the lock assembly 12 has a receiver (not shown) for receiving a signal transmitted from the FOB for locking or unlocking the lock, as is known. The lock assembly 12 may be locked or unlocked form the inside with a key or lever, and remotely using the system for sensing and controlling the status of the door. In the present example, the lock assembly 12 is mounted in a door 34 that is located in a doorframe 16. Wires (not shown) connected to the electrical system of the structure in which the door is located power electronic door lock assembly 12. Such wires can be wired through the door itself or are connected by contact between the door and the doorframe, as is known. A doorknob or handle 18 is also associated with lock assembly 12 (alternatively with the door) as is commonly known. While door 34 is shown as a conventional room door such as is commonly found in a multi-unit building (such as a hotel), door 34 may be a car door, a gate, a garage door, a safe door, or a vault door. Alternatively, lock assembly 12 may be utilized at a window or any device where such a lock would be desirable.

The lock assembly 12 includes an electronic locking mechanism 20 and a visual indication 22, which indicates the status of the locking mechanism. The locking mechanism 20 is actuated in response to a signal initiated by the key (e.g., with a key (conventional or magnetic), a key card (magnetic or punched holes), a security code, a FOB, or a button). The indicator 22 indicates whether or not the locking mechanism 20 is properly engaged for securing the door. The detection of whether or not the door is secure is discussed in more detail below. The indicator 22 is any device suitable for indicating the position of the lock, including but not limited to, a LED (Light Emitting Diode), a lever, or a slide indicator.

Referring also to FIG. 2, lock assembly 12 includes a closed-door position sensor 24 at the interior side of the door. In the present example, sensor 24 is a magnetic switch, with one portion of the switch mounted on the door and the other portion of the switch mounted on the doorframe. With a magnetic switch one of the portions is a magnet and the other is an electronic circuit that senses the magnetic field of the magnet when it is in close proximity, such as with a Hall effect sensor or a magnetic reed switch that closes an electric circuit. Such magnetic switches are well known. Closed-door position sensor 24 alternatively comprises an optical sensor, a mechanical sensor, an electrical sensor, or any other suitable device that will sense the closed condition of the door. Lock assembly 12 also included a locking mechanism sensor 26. The locking mechanism sensor 26 may also be a magnetic switch positioned to sense when the lock mechanism is fully engaged. Alternatively, the locking mechanism sensor 26 comprises an optical sensor, a mechanical sensor, an electrical sensor, or any other suitable device that will sense the fully engaged condition of the locking mechanism 20.

System 10 further includes a signal processor 28 in communication with the electronic locking mechanism 20 and sensors 24 and 26. Processor 28 is configured to prohibit actuation of the locking mechanism 20 when the closed-door position sensor 24 fails to detect a closed condition of the door. Further, processor 28 will only allow actuation of the locking mechanism 20 when closed-door position sensor 24 detects a closed condition of the door. Further, processor 28 generates a signal to the indicator 22 to indicate a secured state of the door when both the closed-door position sensor 24 detects a closed condition of the door and the locking mechanism sensor 26 detects a fully engaged condition of the locking mechanism 20. The processor 28 determines a secured state of the door when the door sensor senses the condition of the door as closed and the locking mechanism sensor senses the condition of the locking mechanism as locked.

If for some reason, the condition of the locking mechanism or the door changes, the respective sensor will detect such, and the processor will determine that the state of the door is unsecured. This could be a result of the door being forced open, the lock being forced to a position other than fully engaged, or the door unlocking in the event of such things as a power failure (when open is the default position). Processor 28 may be incorporated within electronic door lock assembly 12 or its functions are remotely performed at a central processor 30 (FIG. 1).

The two-way communication module 14 comprises a transceiver (alternatively, an individual transmitter 14_a_ and receiver 14_b_) incorporated within electronic door lock assembly 12. The transceiver is in communication with the processor 28 when it is incorporated within electronic door lock assembly 12, or directly with the electronic locking mechanism 20 and sensors 24 and 26 when the processor's functions are performed at the central processor 30. Information is transmitted and received wirelessly between the transceiver and a repeater 32 (FIG. 1) located at the interior of a room associated with the door 34, which is located in close proximity to the electronic door lock assembly 12. The repeater 32 is in communication (wired or wireless, such communication methods being known) with the central processor 30.

Accordingly, the central processor 30 monitors the status of system 10, i.e., the condition of the locking mechanism and of the door itself. The central processor 30 generates commands for locking and unlocking the locking mechanism when desired. Also, status of the door and locking mechanism can be monitored and a notice or warning can be issued when the door and/or locking mechanism is not secure. Further, it will be appreciated that the central processor can control and/or monitor a plurality of doors in a multi-unit building.

The disclosed method may be embodied in the form of computer-implemented processes and apparatuses for practicing those processes. The method can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus capable of executing the method. The present method can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus capable of executing the method. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for determining a state of a door having a locking mechanism for locking the door, the system comprising:

a locking mechanism sensor disposed for sensing a condition of the locking mechanism and generating a signal indicative thereof;

a door sensor disposed for sensing a condition of the door and generating a signal indicative thereof;

a signal repeater for receiving the signals from the locking mechanism sensor and the door sensor; and a processor for determining a state of the door and located remotely relative to the door, the processor responsive to the locking mechanism sensor and the door sensor signals transmitted to the processor by the signal repeater, wherein the state of the door comprises a secured state when the door sensor senses the condition of the door as closed and the locking mechanism sensor senses the condition of the locking mechanism as locked.

2. The system of claim 1 wherein the locking mechanism is associated with an electronic lock assembly.

3. The system of claim 2 wherein the processor is associated with the electronic lock assembly.

4. The system of claim 1 further comprising:

a transmitter receptive the signals from the locking mechanism sensor and the door sensor, the transmitter communicating the signals to the signal repeater.

5. The system of claim 4 further comprising:

a receiver receptive to signals communicated from the signal repeater for controlling the locking mechanism.

6. The system of claim 1 further comprising:

an indicator in communication with the processor for indicating the secured state.

7. The system of claim 6 wherein the indicator is configured to indicate the secured state when the door sensor senses the condition of the door as closed and the locking mechanism sensor senses the condition of the locking mechanism as locked.

8. The system of claim 1 wherein the processor is configured to prohibit the locking mechanism from locking the door when the state of the door does not comprise a secured state.

9. A method for determining a state of a door having a locking mechanism for locking the door, the method comprising:

sensing a condition of the locking mechanism;

sensing a condition of the door;

transmitting the conditions of the locking mechanism and the door to a processor using a signal repeater; and determining a state of the door as a secured state when the condition of the locking mechanism is sensed as locked and the condition of the door is sensed as closed, the determination of the state of the door being performed by a processor located remotely relative to the door.

10. The method of claim 9 further comprising:

transmitting information of the condition of the locking mechanism and of the condition of the door from at least one sensor to the signal repeater to allow the determining the state of the door as the secured state to be performed remotely relative to the door.

11. The method of claim 10 further comprising:

receiving information from remotely relative to the door for controlling the locking mechanism.

12. The method of claim 9 further comprising:

indicating the secured state.

13. The method of claim 12 wherein indicating the secured state comprises indicating the secured state when the condition of the locking mechanism is sensed as locked and the condition of the door is sensed as closed.

14. A system for determining a state of a door having a locking mechanism for locking the door, the system comprising:

means for sensing a condition of the locking mechanism and generating a signal indicative thereof;

means for sensing a condition of the door and generating a signal indicative thereof;

means for communicating signals received from the locking mechanism sensing means and the door condition sensing means; and means for determining a state of the door from a remote location relative to the door, the means for determining responsive to the signals from the locking mechanism sensing means and the door condition sensing means, the signals transmitted to the means for determining by the means for communicating, wherein the state of the door comprises a secured state when the door condition sensing means senses the condition of the door as closed and the locking mechanism sensing means senses the condition of the locking mechanism as locked.

15. The system of claim 14 wherein the locking mechanism is associated with an electronic lock assembly.

16. The system of claim 15 wherein the means for determining is associated with the electronic lock assembly.

17. The system of claim 14 further comprising:

means for transmitting the signals from the locking mechanism sensor and the door sensor to the means for communicating.

18. The system of claim 17 further comprising:

means for receiving signals communicated from the means for determining to control the locking mechanism.

19. The system of claim 14 further comprising:

means for indicating the secured state.

20. The system of claim 19 wherein the means for indicating the secured state is configured to indicate the secured state when the door condition sensing means senses the condition of the door as closed and the locking mechanism sensing means senses the condition of the locking mechanism as locked.

* * * * *